A. WINTON.
THRUST BEARING STRUCTURE.
APPLICATION FILED DEC. 23, 1916.
1,320,030.
Patented Oct. 28, 1919.
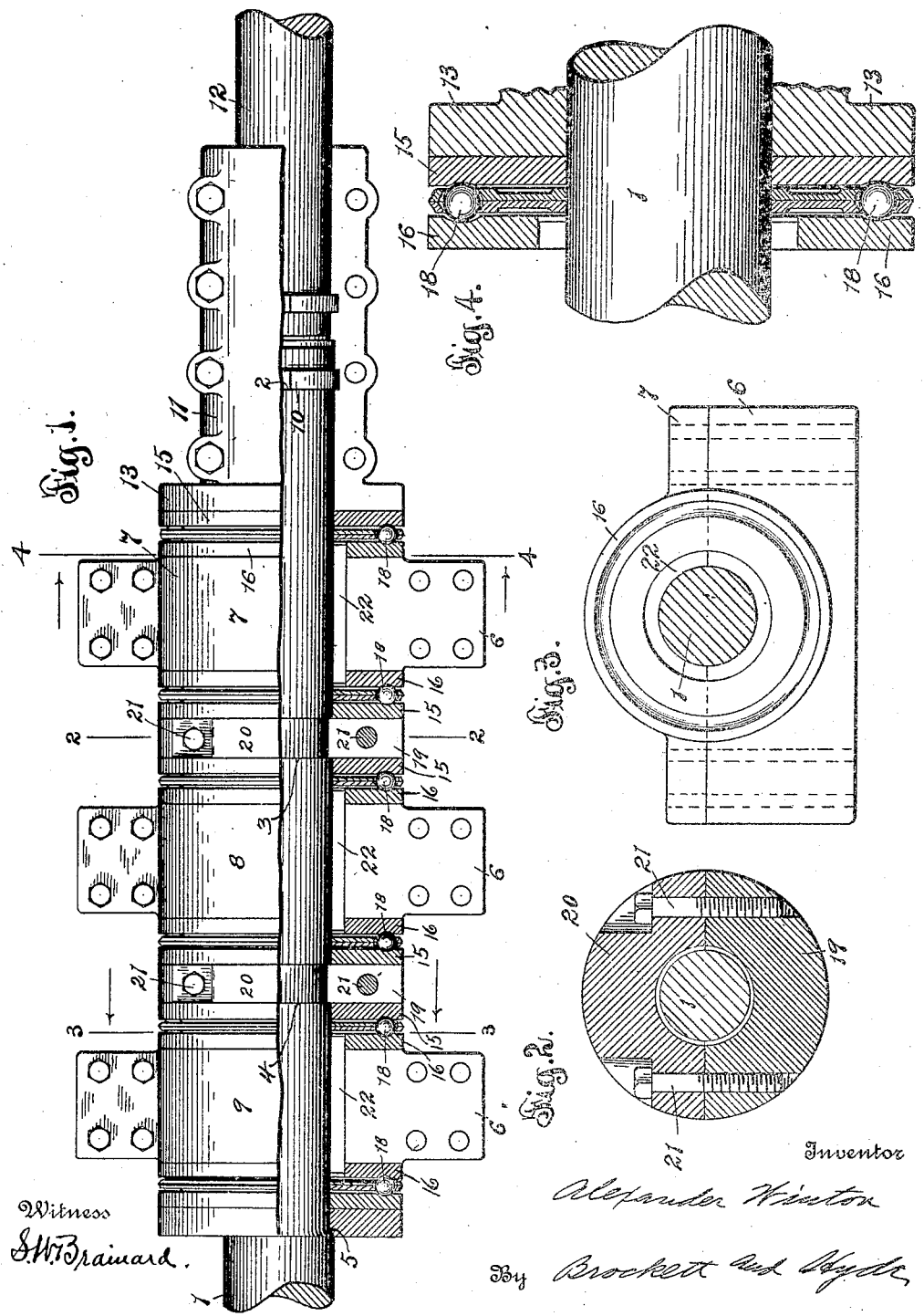

UNITED STATES PATENT OFFICE.

ALEXANDER WINTON, OF LAKEWOOD, OHIO.

THRUST-BEARING STRUCTURE.

1,320,030.   Specification of Letters Patent.   Patented Oct. 28, 1919.

Application filed December 23, 1916. Serial No. 138,654.

*To all whom it may concern:*

Be it known that I, ALEXANDER WINTON, citizen of the United States, residing at Lakewood, in the county of Cuyahoga and State of Ohio, have invented certain new and useful Improvements in Thrust-Bearing Structures, of which the following is a specification.

This invention relates to thrust bearings and particularly to bearings of this type wherein the thrust is taken by a plurality of ball bearings arranged between fixed members on the shaft and fixed bearings or supports.

More specifically the invention relates to a shaft and bearing structure comprising fixed spaced main shaft bearings, a shaft with annular recesses between said main bearings, collars arranged in said recesses and thrust ball bearings located between said collars and the main bearings.

The invention may be further briefly summarized as consisting in the construction and combination of parts hereinafter set forth in the following description, drawings and claim.

Referring to the drawings, Figure 1 is a view partly in section and partly in plan; Fig. 2 is a cross section through one of the collars and the shaft; Fig. 3 is a side elevation of one of the main bearings; and Fig. 4 is an enlarged sectional view of the thrust bearing to the right as shown in Fig. 1.

In the drawings 1 represents the shaft provided in the present instance with a plurality of annular grooves three being shown and indicated at 2, 3 and 4. The shaft is also provided with a shoulder 5. Between the grooves 2 and 3 is a main split bearing comprising the parts 6 and 7 while similar main bearing structures 8 and 9 are arranged between the grooves 3 and 4 and the shoulder 5 as shown.

Engaging in the groove 2 are half rings 10 which are thick enough to extend out of the groove and engage in internal grooves formed in the inner wall of a split coupling or collar 11. In the present instance this member 11 is a coupling for connecting the main shaft and the shaft 12 but it may be a collar or other shoulder on the shaft.

The coupling 11 is provided with a flange 13 and between this flange and the side of the bearing, comprising the parts 6 and 7, is a complete thrust ball bearing structure consisting of the thrust washers 15 and 16, the ball retainer ring 17 and the balls 18. This same ball bearing structure is repeated in pairs between the several main bearings and singly between the last main bearing to the left as shown and the shoulder 5. Between the pairs of thrust bearing structures between the main bearings are split collars consisting of the halves 19 and 20 secured together by screws 21. Within the main bearing members 6, 7 etc., are split bronze bearing sleeves 22, the bearing washers 16 of the ball bearing structure having a tight fit upon said sleeves so as to be nonrotatable with the shaft. The several bearing washers 15 of course rotate with the shaft. By this arrangement the entire thrust is taken up by the several thrust bearing structures and distributed to the several main bearings.

Having described my invention, I claim:—

In a shaft bearing, the combination with a shaft having a series of annular grooves, of stationary main bearing members located between said grooves and having bearing sleeves surrounding the shaft, split collars secured in said grooves to rotate with the shaft, stationary thrust washers surrounding the ends of the bearing sleeves, thrust washers at the sides of the collars and rotatable with the shaft, bearing ball carrying rings surrounding the shaft between said stationary and rotatable thrust washers and balls between said ball carrying rings.

In testimony whereof I affix my signature.

ALEXANDER WINTON.

Copies of this patent may be obtained for five cents each, by addressing the "Commissioner of Patents, Washington, D. C."